United States Patent

Giles et al.

[15] 3,656,064

[45] Apr. 11, 1972

[54] DATA DEMODULATOR EMPLOYING COMPARISON

[72] Inventors: George R. Giles, Williamsville; Donald G. Shuda, Clarence Center, both of N.Y.

[73] Assignee: Sanders Associates, Inc., Nashua, N.H.

[22] Filed: Sept. 17, 1969

[21] Appl. No.: 858,627

[52] U.S. Cl. ....... 329/104, 178/66, 325/320, 328/48, 329/126, 329/145

[51] Int. Cl. ....... H04l 27/14

[58] Field of Search ....... 329/104, 126, 145; 325/320; 178/66; 328/151, 136, 137, 138, 48

[56] References Cited

UNITED STATES PATENTS

| | | | |
|---|---|---|---|
| 3,092,736 | 6/1963 | Ernyei | 329/104 X |
| 3,387,220 | 6/1968 | Lender | 329/104 |
| 3,392,337 | 7/1968 | Neuburger | 329/145 |
| 3,571,712 | 3/1971 | Hellwarth et al. | 325/320 |

FOREIGN PATENTS OR APPLICATIONS

| | | | |
|---|---|---|---|
| 935,655 | 9/1963 | Great Britain | 329/104 |

*Primary Examiner*—Alfred L. Brody
*Attorney*—Louis Etlinger

[57] ABSTRACT

Data demodulator which demodulates a received signal by means of comparing the received signal with itself delayed to produce a comparison signal having one amplitude value upon identity and another different amplitude value upon non-identity. The comparison is performed by a modulo two network herein illustrated as an EXCLUSIVE OR gate. The comparison signal is filtered by a digital filter which includes an UP/DOWN counter and associated control circuitry. The output of the digital filter is sampled by a JK flip-flop to provide the demodulated data signal.

12 Claims, 2 Drawing Figures

PATENTED APR 11 1972 3,656,064

SHEET 1 OF 2

*INVENTORS*
GEORGE R. GILES
DONALD G. SHUDA

BY Robert R. Hubbard

*ATTORNEY*

INVENTORS
GEORGE R. GILES
DONALD G. SHUDA
BY Robert R. Hubbard
ATTORNEY

DATA DEMODULATOR EMPLOYING COMPARISON

BACKGROUND OF THE INVENTION

This invention relates to new and improved signalling apparatus and in particular to data receiver apparatus for detecting digital data signals from a data modulated signal received via a communication channel, such as a radio link, microwave link, cable or wire link and the like. The data receiver of the present invention is useful for any suitable bandwidth of the channel including voice grade channels.

Data signals comprise bits of information that are generally represented by amplitude levels which are constant for a period or time often called a bit period. The bit signals are arranged in data words in different permutations of a code to represent alphanumeric characters and other symbols. For a binary system, there are usually two amplitude levels, one indicative of a "1" and the other of a "0" bit value. It is convenient in data communications to refer to the "1" and "0" bit values as a "mark" and "space," respectively, in accordance with the terminology of telegraphy. When a message (a data word or group of words) is transmitted, it is customary to precede or succeed it with a code to condition the receiver to receive or not receive, as the case may be.

The transmission of digital data over voice communication channels is a significant feature of many modern electronic systems. Data processors, high-speed teleprinters and other devices must frequently be interconnected over existing communication channels. Unfortunately, the characteristics of many existing voice communication circuits are not suitable for the direct transmission of digital information since such channels are generally incapable of transmitting frequency components down to and including zero frequency. For this reason, it is customary to employ a carrier signal that is modulated in either an amplitude modulating (AM), frequency modulating (FM) or phase modulating (PM) fashion by the digital information to be transmitted.

Of particular interest to the present invention are FM systems in which the carrier consists of different tone (frequency) signals for each bit value, frequently called frequency shift keying (FSK), and PM systems in which the carrier comprises one or more tones with each tone having two or more phases to represent the data bit values, frequently called phase shift keying (PSK). One type of prior art data demodulator derives the bit value by means of detecting the axis crossings. For example, in an FSK system the time between successive axis crossings of the lower bit tone is shorter than the time between successive axis crossings of the lower bit tone. In PSK systems, axis crossing information is, in some cases, indicative of the bit period such that bit timing information can be derived and used to detect changes in carrier phase. In both PSK and FSK axis crossing demodulators a filter is generally required to integrate the axis crossing information in order to provide a suitable sampling or decision threshold of margin between the high and low bit values. In addition, a similar scheme is employed as a carrier presence detector in the particular implementation chosen. In other prior art FSK systems, the receiver includes high and low bit tone bandpass filters, corresponding envelope detectors and a decisional comparator for providing a data output amplitude indicative of the larger of the two envelopes.

Analog implementations of the aforementioned types, as well as other types, of demodulators have encountered various problems including adjustment and drift. Digital implementations of these demodulator types have required rather complex digital networks necessitating high component counts as well as diverse part numbers in order to provide acceptable performance.

BRIEF SUMMARY OF THE INVENTION

An object of the present invention is to provide a novel and improved data demodulator.

Another object is to provide an improved data demodulator which can be embodied in relatively simple digital network configurations.

Still another object is to provide new and improved digital signal processing apparatus.

Apparatus embodying the invention operates on the identity and non-identity of the received modulated signal with a delayed replica of itself to produce a comparison signal having one value upon identity and another different value upon non-identity. This operation is embodied in an EXCLUSIVE OR network which operates on the received signal after limiting and on the delayed limited signal to provide the comparison signal. The comparison signal is then filtered in a digital filter which can be a rather simple UP/DOWN counter with control logic which senses the threshold levels of the counter to provide indications thereof to a data sampling network.

BRIEF DESCRIPTION OF THE DRAWINGS

In the accompanying drawings, like reference characters denote like structural elements, and.

DESCRIPTION OF THE PREFERRED EMBODIMENT

It is contemplated that the present invention can be embodied in any data demodulating apparatus which is employed in a system where the modulated carrier has at least one half cycle during a bit period, a bit period being the reciprocal of the data or bit rate. For instance, data demodulating apparatus embodying the invention may be embodied in either FSK or PSK type systems. However, by way of example and completeness of description, an FSK demodulator embodying the invention will be described.

In an FSK modulated signal, the frequency of the signal represents the data information. That is, irrespective of the method of digital or other coding of the wave, a first given frequency or tone represents a mark while a second given frequency represents a space. For convenience in the following description, the higher bit tone $f_H$ will be considered as the space bit value, and the lower bit tone will be considered as the mark bit value.

Figure 1:
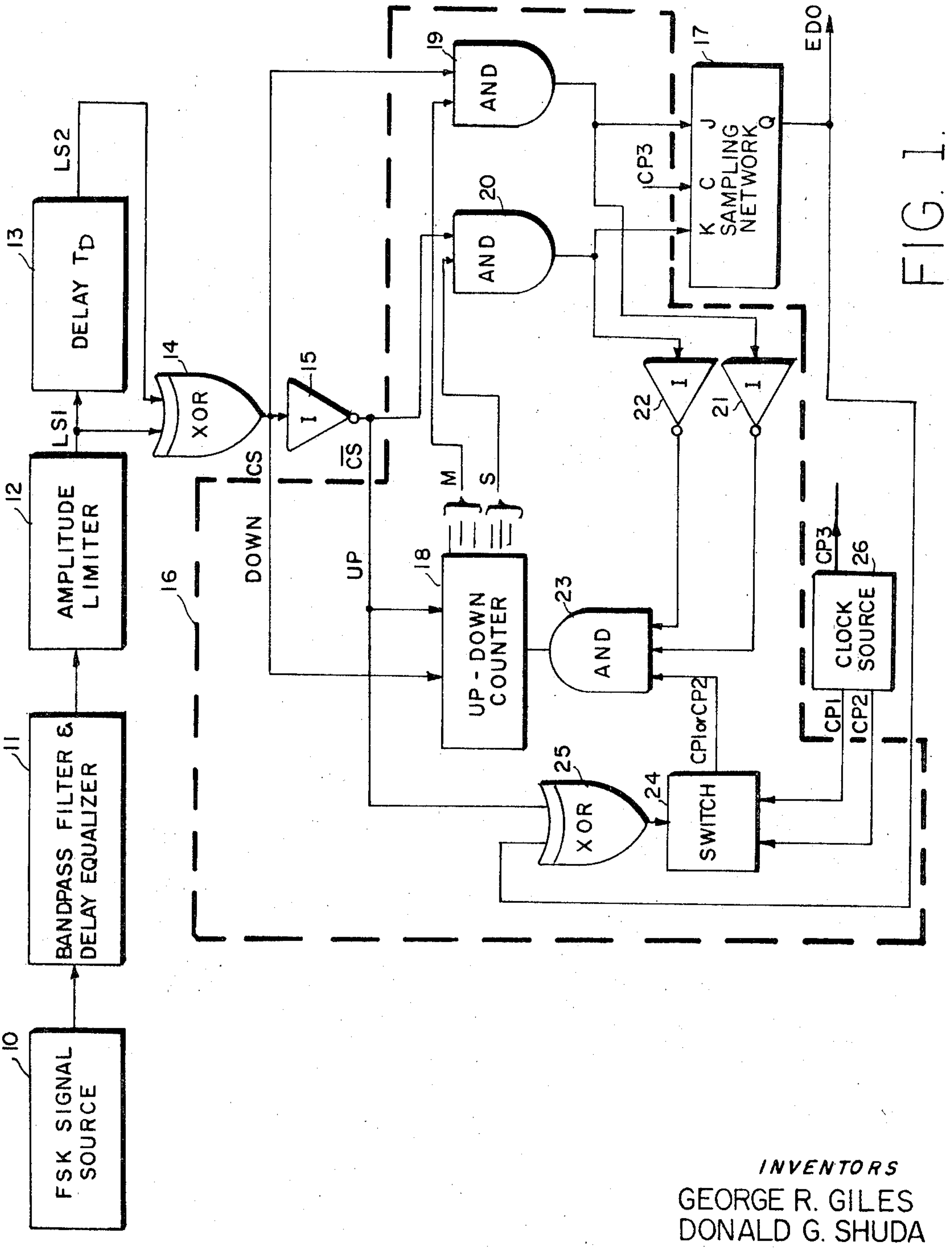
FIG. 1 is a block diagram, in part, and a logical network schematic, in part, of data demodulating apparatus embodying the present invention.

An FSK demodulator embodying the invention will now be described in connection with the apparatus diagram of FIG. 1 and the waveform diagram of FIG. 2 which depicts, inter alia, the signals which occur at various points in the FIG. 1 demodulating apparatus. In FIG. 1 FSK signals of the type described above are provided from a source 10. It will be appreciated that the received FSK signals are usually derived from a communication channel such as a wire or cable link, microwave link, radio link and the like, with the source 10 including the necessary receiving equipment. In addition, it is to be noted that the FSK signal at the sending end of the channel may be FSK modulated by any suitable FSK modulator.

The FSK signal from source 10 may be applied to a delay equalizer network and bandpass filter 11 depending on the communications channel characteristics. The delay equalizer network functions in the normal manner to provide envelope delay equalization and, for example, may consist of any suitable all pass network. The bandpass filter is operative to pass all of the frequencies which are expected to be in the FSK signal. For instance, in an exemplary system the bit tones $f_H$ and $f_L$ may be 2,200 hertz and 1,200 hertz, respectively; and the bandpass filter 11 has a center frequency of 1,700 hertz. The signals from the bandpass filter 11 may be amplified as necessary by means not shown and applied to an amplitude limiter 12. The amplitude limiter 12 is operative to clip the sinusoidal type FSK signal passed by filter 11 to provide at its output a limited signal LS1, the waveform of which is shown in FIG. 2.

Figure 2:
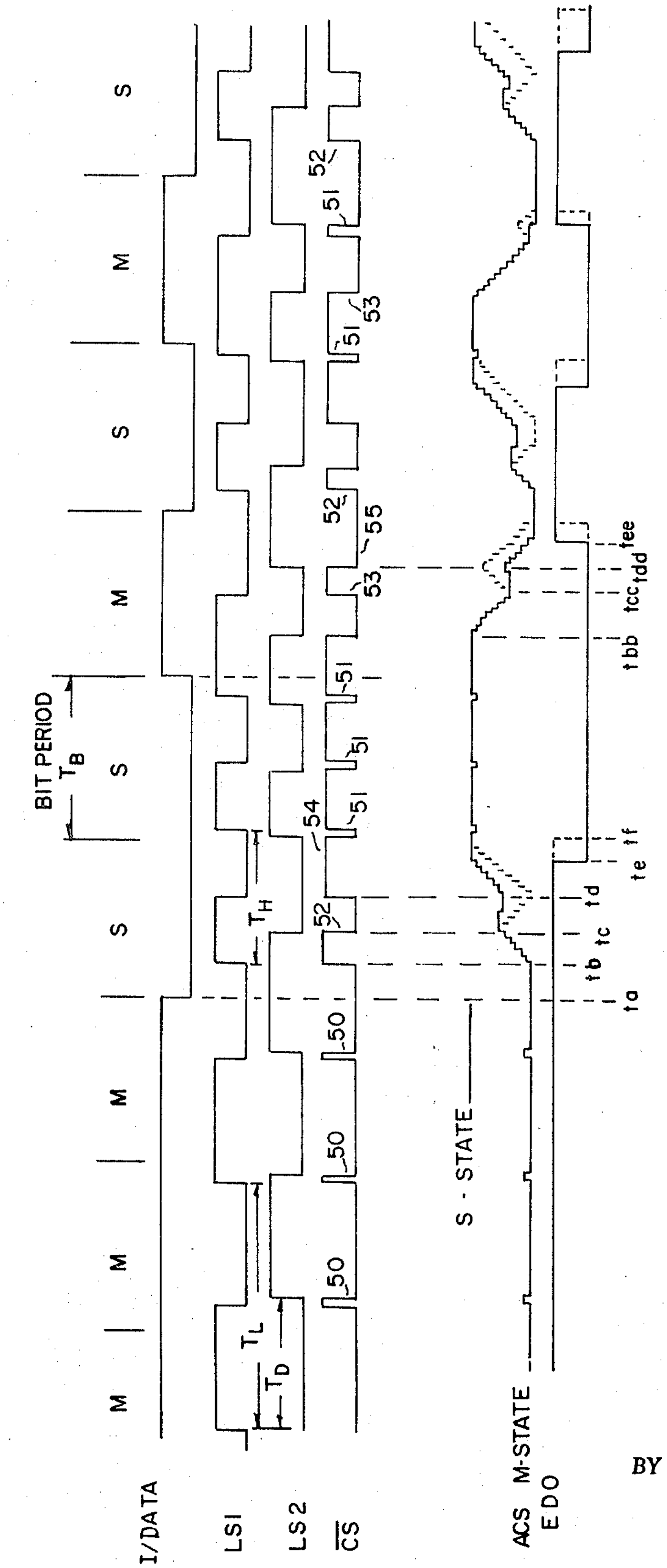
FIG. 2 is a waveform diagram for the signals occurring at various points in the data demodulating apparatus of FIG. 1.

With reference now to FIG. 2, the limited FSK signal LS1 is representative of a typical sequence of mark and space bit tones. The digital data amplitude level waveform I/DATA corresponding to the mark and space tone sequence is illustrated above the LS1 signal waveform, all of the waveforms in FIG. 2 having a common time base. The bit periods $T_B$ for the data sequence are illustrated above the I/DATA waveform and are labeled M or S for mark and space, respectively.

When the FSK signal is compared with itself delayed by a time $T_D$ for identity and non-identity, a change in tone frequency (i.e., bit values) can be detected. Thus, in FIG. 2 the waveform LS2 is identical to the waveform LS1 but is delayed in time by $T_D$. An identity and non-identity operation on waveforms LS1 and LS2 produces a resultant waveform $\overline{CS}$ which has a low value for the case of non-identity and a high value for the case of identity. For the case where the LS1 wave is a low bit tone (mark) the $\overline{CS}$ wave has a value which is predominantly low. For the other case where the LS1 waveform is a high bit tone (space) the $\overline{CS}$ waveform has a value which is predominantly high.

The narrow high going excursions 50 of wave $\overline{CS}$ are due to the delay $T_D$ being greater than the half period $(1/2f_L)$ of the low bit tone. The narrow low going excursions 51 are due to the delay to being less than the period $(1/f_H)$ of the high bit tone. The widths of the wider excursions 52 and 53 are related not only to the value of $T_D$ but also to the point in the low or high bit tone cycle, as the case may be, that a change in tone takes place. If the delay $T_D$ were equal to the half period of $f_L$, the excursions 50 would be eliminated, excursions 52 would be more narrow and excursions 51 and 53 would become wider. As delay $T_D$ is made smaller than $(1/2f_L)$, excursions 50 again appear; and excursions 50, 51 and 53 become progressively wider such that the average values of $\overline{CS}$ tends to approach zero when averaged over a bit period. On the other hand, as delay $T_D$ is made larger than the illustrated amount, the excursions 50, 51 and 52 also become progressively wider (after $T_D = 1/f_H$) such that the average value of $\overline{CS}$ over a bit period approaches zero.

In order to detect changes in tone of the modulated signal, the delay $T_D$ must be such that a suitable decision or threshold margin exists between the predominately high and low $\overline{CS}$ signal levels which represent space and mark tones, respectively. This margin is somewhat degraded as the delay $T_D$ is made smaller or larger than the illustrated amount. For a practical FSK system, it has been determined that the value of $T_D$ should fall between the values of the half period of the low bit tone $(1/2f_L)$ and the full period of the high bit tone $(1/f_H)$, it being understood that $(1/2f_L)$ can be either less than or greater than $(1/f_H)$. The maximum threshold margin occurs when $T_D$ equals three-quarters of the period of mean frequency of the high bit tone and the low bit tone, or $$T_D=3/4\left(\frac{1}{\left(\frac{f_L+f_H}{2}\right)}\right)$$

The delay $T_D$ in FIG. 2 is illustrated for this maximum condition. It should be understood, however, that smaller or larger values of $T_D$ may be employed but with degradation in decision or threshold margin.

Referring again to FIG. 1, the signal LS1 is delayed by the amount of $T_D$ by means of a delay device 13 to produce the signal LS2. Delay device 13 may be any suitable delay network and, for example, may be a shift register clocked at a suitable rate to produce the delay $T_D$. The identity and non-identity operation on signals LS1 and LS2 is performed by an EXCLUSIVE OR network 14. As is known in the art, the output of an EXCLUSIVE OR network is high only when either one or the other, but not both, of its inputs is high (non-identity) and is low for all other input signal conditions (identity). Thus the the illustrated example, the output of EXCLUSIVE OR network 14 is high and low when its input signals LS1 and LS2 are non-identical and identical, respectively. The foregoing identity and non-identity operation is sometimes referred to as modulo two addition. The output signal of EXCLUSIVE OR network 14 is designated CS in FIG. 1 and its complement $\overline{CS}$ is produced by means of inverter 15, the complement $\overline{CS}$ being illustrated in FIG. 2.

It should be noted that the illustrated logic networks 14 and 15, as well as the hereinafter referred to logic networks, are by way of example only and that other logic networks may be employed. For example, network 14 might include suitable signal inverting circuitry such that its output would be $\overline{CS}$ and the output of inverter 15 would be CS.

A digital filter network 16 filters the identity/non-identity signal $\overline{CS}$ and/or its complement CS and a sampling network 17 samples the output of filter 16 to produce a bi-valued output signal EDO which is illustrated in FIG. 2 and which is indicative of the mark and space information contained in the modulated signal LS1. The filter 16 includes an UP/DOWN counter 18 and associated control logic networks. The counter 18 may be any suitable UP/DOWN digital counter and, by way of example, may be a ripple counter arranged to increment and decrement at a clock rate of CP1 or CP2 in accordance with control signals applied to UP and DOWN control leads, respectively.

In the present embodiment sampling network 17 senses a pair of counter output conditions M and S to provide high and low output signal levels, respectively. The counter 18 responds to the CS and $\overline{CS}$ signals applied to its DOWN and UP control leads, respectively, to decrement to the M output count condition and to increment to the S output count condition. Thus, the M and S counter output conditions correspond to the predominately lower and higher, respectively, values of the $\overline{CS}$ signal in FIG. 2. The separation (threshold margin) between the S state and M state is defined as a number (S–M). The optimum choice of this separation (S–M) is established as a function of the clock rates, the bit rate, the comparison waveform $\overline{CS}$, and noise. In one exemplary design, the counter 18 has six stages. When the outputs of three of these stages are high, counter 18 is in the M state and when the outputs of the remaining three stages are high the counter is in the S state.

The counter 18 and the aforementioned control circuitry which together form filter 16 acts to filter out the excursions 50 to 53 of the $\overline{CS}$ signal (and necessarily the CS signal). The control circuitry includes a first circuit means which responds to the CS, $\overline{CS}$, M and S signals to (1) provide a filter output to sampling network 17, (2) to enable counter 18 to count from one of its S or M states toward the other when there is a change in $\overline{CS}$ signal level and (3) to inhibit counter 18 when either the S or M count condition is attained. This first circuit means includes a pair of AND gates 19 and 20 which receive the M and S counter outputs, respectively. The AND gates 19 and 20 also receive as inputs the CS and $\overline{CS}$ signals. The output of AND gates 19 and 20 after inversion by inverters 21 and 22, respectively, are applied as enabling inputs to a clocked AND gate 23 which provides clock signals to counter 18 when enabled. The clock signal input to AND gate 23 is either of two different rate clock signals CP1 or CP2, both of which are supplied by a clock source 26. The circuitry determining which of the two clock signals is to be employed and the purpose thereof will be described later.

The output signal conditions for AND gates 19 and 20 are illustrated in TABLE I for the four conditions of the M, S, CS, and $\overline{CS}$ signals, the M and S signals each being considered as a single signal since all of each have to be high to enable its corresponding AND gate. The letters H and L denote high and low signal levels, respectively.

TABLE I

| | M | CS | AND 19 | S | $\overline{CS}$ | AND 20 |
|---|---|---|---|---|---|---|
| (1) | H | H | H | L | L | L |
| (2) | H | L | L | L | H | L |
| (3) | L | H | L | H | L | L |
| (4) | L | L | L | H | H | H |

In TABLE I the first and fourth signal conditions correspond to the mark and space tones, respectively, of the LS1 signal and hence to the low and high average values of the $\overline{CS}$ signals. For these first and fourth signal conditions AND gate 23 is inhibited from passing clock signals to the counter 18. On the other hand, the second and third conditions in TABLE I correspond to the excursions 50 and 52 and the excursions 51 and 53, respectively, of the $\overline{CS}$ signal (FIG. 2). For the second and third signal conditions AND gate 23 is enabled to pass clock signals to the counter 18.

As previously pointed out, the threshold margin of counter 18 is such that counter 18 responds to excursions of width on the order of excursions 50 through 53 of signal $\overline{CS}$ in FIG. 2 to count only a portion of the way toward the S or M state, as the case may be, and then to count back toward the original state. On the other hand, an excursion width on the order of excursions 54 or 55 of the $\overline{CS}$ signal is responded to by counter 18 to count all of the way to the S or M state as the case may be.

In the illustrated embodiment the output of digital filter 16 is taken from the outputs of AND gates 19 and 20 which are applied as inputs to the sampling network 17. The sampling network 17 includes any suitable circuitry which responds to the output signal levels of filter 16 to produce a bi-valued signal such as wave EDO (FIG. 2). As illustrated In FIG. 1, sampling network 17 may appropriately be a JK flip-flop having its J and K inputs connected to receive the outputs of AND gates 19 and 20, respectively. The flip-flop clock input C is connected to receive a clock signal CP3 supplied by the clock source 26. Finally, the Q output of the flip-flop is connected to provide the output signal EDO.

With reference to FIG. 2 and to TABLE I, the JK flip-flop responds to a high level signal (mark) at the output of AND gate 19 (J input) on the next succeeding one of the clock signals CP3 to place or hold, as the case may be, its output Q in a high level signal condition. On the other hand, flip-flop 17 responds to a high level signal (space) at the output of AND gate 20 (K input) to place or hold, as the case may be, its output Q in a low level signal condition. For the TABLE I signal conditions where the outputs of both AND gates 19 and 20 are low, flip-flop 17 holds its previous state. Thus, flip-flop 17 does not respond to fluctuations of counter 18 caused by excursions 50 to 53 of signal $\overline{CS}$ in FIG. 2. It should be noted (table 1) that the signal condition where both J and K inputs are high (the triggerable flip-flop condition) is not allowed by the control logic circuitry of filter 16.

As previously pointed out, AND gate 23, when enabled, passes a selected clock signal CP1 or CP2 to counter 18, with signals CP1 and CP2 having different frequencies. The purpose of employing two different clock frequencies for counter 18 is to reduce time jitter in output signal EDO. That is, the use of two clock rates in the manner described below tends to reduce or make more uniform the time delay between a change in tone frequency of the modulated wave LS1 (FIG. 2) and a corresponding data transition in output signal EDO and also to make the bit periods of the recovered signal EDO more uniform.

In FIG. 2, each tone change produces a relatively wide excursion from an initial level of wave $\overline{CS}$ followed by a return to the initial level before there is a significant change to the opposite level. Thus, at time $t_a$, FSK modulated wave LS1 changes from the mark tone $f_L$ to the space tone $f_H$. The wave $\overline{CS}$ responds at $t_b$ with high going excursion 52 and then returns to the low level at $t_c$ time before finally changing to the high level at $t_d$ for a time period sufficient for counter 18 to count all of the way from the M count state to the S count state. The problem here is that the time intervals $t_b$ to $t_c$ and $t_c$ to $t_d$ vary from one tone change to another in accordance with the point in the tone cycle that a change in tone occurs.

If counter 18 were operated at only one clock rate sufficient to provide an adequate threshold margin, it would count part way from the M to S state from $t_b$ to $t_c$, count back most or all of the way to the M state during $t_c$ to $t_d$ and, then, at $t_d$ begin anew the count toward the S state finally arriving at time $t_f$. This is illustrated in FIG. 2 by the dashed portions of the waveform ACS which waveform is an analog representation of the states of counter 18. Thus, the dashed wave portion between times $t_c$ and $t_f$ represents the action of the counter 18 when clocked at a single rate.

In accordance with one feature of the invention, the counter 18 is caused to count at a slower rate during the fallback interval $t_c$ to $t_d$ and then resume the high rate count at time $t_d$. The effect of this is that counter 18 falls back toward the M state only slightly between times $t_c$ and $t_d$ and thus reaches the S state more rapidly when the higher rate count is resumed, thereby resulting in a more linear change in counter states. The same technique is also employed for S to M tone changes. Thus, counter 18 counts at the higher rate from $t_{bb}$ to $t_{cc}$, at the lower count rate from $t_{cc}$ to $t_{dd}$ and at the higher rate again after $t_{dd}$ to attain the M state at time $t_{ee}$. The use of the slower clock rate during the fallback intervals tends to make the counter 18 count in a more linear manner between the S and M states in more uniform time intervals so as to reduce the effects of jitter.

The control circuitry included in filter 16 for effecting the foregoing counter operation includes a switch 24 for coupling either the higher rate CP1 or the lower rate CP2 clock signal to AND gate 23 in accordance with the modulo two sum of the $\overline{CS}$ and EDO signals provided by EXCLUSIVE OR network 25. That is, when $\overline{CS}$ and EDO are non-identical (indicating a possible tone change), switch 24 couples the higher rate clock signal CP1 to AND gate 23 and when $\overline{CS}$ and EDO are identical (indicating a possible fallback interval), switch 24 couples the lower rate clock signal CP2 to AND gate 23. The switch 24 may be any suitable switching circuit which responds to a control signal to couple one of plural signals to an output lead.

It will be appreciated that the control logic circuits 19, 20, 23, 25 may include signal inversion circuitry such that the AND gates become NAND gates and the EXCLUSIVE OR gate 25 becomes an $\overline{\text{EXCLUSIVE OR}}$ gate provided logical signal flow is observed and other appropriate gate changes are made.

There has been described an FSK demodulator embodiment of the present invention. As previously pointed out, the illustrated logic circuitry is by way of example only, and other suitable arrangements may be employed. In addition, the modulo two addition networks 14 and 25 may take on other forms than the illustrated EXCLUSIVE OR gates. It is also understood that other arrangements of the digital filter 16 may be employed. For instance, a digital or analog integrator may be employed.

It will be further appreciated that the comparison and filtering technique embodying the invention may be employed to demodulate signals of types other than FSK. For example, the invention may be embodied in PM systems in which there are an integral number of half cycles of the carrier in a bit period. In particular, the illustrated embodiment can be readily designed to demodulate differentially encoded binary PSK signals.

We claim:

1. A demodulator for detecting first and second digital values of a modulating data signal from a carrier signal which is modulated to have first and second frequencies $f1$ and $f2$ corresponding to the first and second digital values, respectively where $f1 < f2$;

means for delaying said modulated carrier signal relative to itself by an amount $T_D$ which falls between the half period of $f2$ and the period of $f2$;

a comparator for operating on the identity and non-identity of said modulated signal and the delayed version thereof to produce a comparison signal having first and second amplitude values upon identity and non-identity, respectively;

a digital filter including (1) counting means selectively enabled to count in first and second directions in response to the first and second levels of said comparison signal and (2) control circuitry for inhibiting the counter from counting beyond first and second counter states and for enabling the counter to count from one of said counter states toward the other upon the occurrence of transitions between the levels of the comparison signal, whereby the output of said counter provides an indication of the modulating data signal.

2. The invention according to claim 1 and further including sampling means for sampling said indication to produce a signal having different amplitude levels corresponding to the first and second digital values.

3. The invention according to claim 2 wherein said digital filter further includes a source of signals to be counted coupled to said counting means by a gating circuit; and wherein said control circuit is responsive to said comparison signal and to the first and second counter states for (1) enabling the gating circuit in response to each transition of the comparison signal and (2) inhibiting the gating circuit whenever either of the counter states is reached.

4. The invention according to claim 3 wherein said comparison signal includes fallback intervals upon the occurrence of changes in frequency of said modulating signal such that one transition of a pair of transitions defining such a fallback interval occurs before the counter counts from either of said states to the other; and wherein said control circuitry includes further means for coupling to said gating network from said source signals of a relatively high frequency whenever said counter begins to count from either of said states toward the other and signals of a relatively lower frequency during said fallback intervals.

5. A demodulator for detecting first and second digital values of a modulating data signal from a carrier signal which has been modulated by said data signal; said demodulator comprising:

means for comparing said modulated carrier signal with a delayed version of itself to provide a comparison signal having first and second amplitude values upon identity and non-identity, respectively; and a digital filter for filtering said comparison signal to provide an indication of the modulating information, said filter including digital counting means enabled to count in first and second directions in response to the first and second values, respectively, of said comparison signal, whereby the count value of the counting means represents said indication of the modulating information.

6. The invention according to claim 5 wherein said comparison signal represents the modulo two sum of the modulated carrier signal and the delayed version thereof.

7. The invention according to claim 6, and further including means for converting said filter provided indication to a demodulated signal indicative of the modulating data signal.

8. The invention according to claim 7 wherein said digital filter further includes a source of signals to be counted coupled to said counter by a gating circuit and a control circuit responsive to said comparison signal and to first and second counter states for (1) enabling said gating circuit in response to each transition of the comparison signal and (2) inhibiting said gating circuit whenever either of said counter states is reached.

9. The invention according to claim 8 wherein said carrier signal is modulated to have first and second frequencies corresponding to the first and second digital values, respectively, wherein said comparison signal includes fallback intervals upon the occurrence of changes in frequency of said modulating signal such that one transition of a pair of transitions defining such a fallback interval occurs before the counter counts from either of said states to the other, and wherein said control circuitry includes further means for coupling to said gating network from said source signals of a relatively high frequency whenever said counter begins to count from either of said states toward the other and signals of a relatively lower frequency during said fallback intervals.

10. The invention according to claim 2 wherein said comparison means includes modulo two addition means responsive to said modulated signal and the delayed version thereof to provide the modulo two sum thereof, the modulo two sum corresponding to said comparison signal.

11. The invention according to claim 10 wherein said comparison signal includes fallback intervals upon the occurrence of changes in frequency of said modulated signal, such that one transition of a pair of transitions defining such a fallback interval occurs before the counter counts from either of said states to the other, and wherein said control circuitry includes further means for causing said counter to count at a first rate whenever the counter begins counting from either of the states to the other and at a second lower rate during said fallback intervals.

12. The invention according to claim 11 wherein $T_D$ is three-fourths of the mean frequency of said first and second frequencies.

* * * * *

PO-1050
(5/69)

UNITED STATES PATENT OFFICE
CERTIFICATE OF CORRECTION

Patent No. 3,656,064 Dated April 11, 1972

Inventor(s) George R. Giles, et al

It is certified that error appears in the above-identified patent and that said Letters Patent are hereby corrected as shown below:

| | |
|---|---|
| Column 1 line 46 | Change "lower" to --higher-- |
| Column 3 line 71 | Delete "the" (first occurrence) substitute --for--. |
| Column 4 line 11 | Change "$\overline{CS}$" (first occurrence) to CS |
| Column 4 line 11 | Change CS (second occurrence) to $\overline{CS}$ |
| Column 6 line 63 | change "F2" to --fl--. |

Signed and sealed this 2nd day of Janaury 1973.

SEAL)
ttest:

DWARD M.FLETCHER,JR.
ttesting Officer

ROBERT GOTTSCHALK
Commissioner of Patents